United States Patent [19]

Abrant et al.

[11] Patent Number: 4,703,452
[45] Date of Patent: Oct. 27, 1987

[54] INTERRUPT SYNCHRONIZING CIRCUIT

[75] Inventors: Robert J. Abrant, Villa Park, Ill.;
Michael D. Martys, Pittsfield, Mass.;
George K. Tarleton, Itasca, Ill.

[73] Assignee: GTE Communication Systems
Corporation, Northlake, Ill.

[21] Appl. No.: 815,842

[22] Filed: Jan. 3, 1986

[51] Int. Cl.⁴ ............................................. G06F 13/42
[52] U.S. Cl. .................................................. 364/900
[58] Field of Search ... 364/200 MS File, 900 MS File

[56] References Cited

U.S. PATENT DOCUMENTS 4,428,044 1/1984 Liron ................................. 364/200

*Primary Examiner*—Thomas M. Heckler
*Attorney, Agent, or Firm*—Gregory G. Hendricks; Robert J. Black

[57] ABSTRACT

A synchronizing circuit that synchronizes the non-maskable interrupt (NMI) input signals of two separate microprocessor subsystems that are running synchronously as part of a fault tolerant computer system. This circuit enables both microprocessors to detect and respond to an error condition at an identical point in their relative bus timing sequence even though there may be a real time skew between the bus timing of these two subsystems. Storage and gating circuitry are used to provide the precise timing signals required for such synchronization.

12 Claims, 1 Drawing Figure

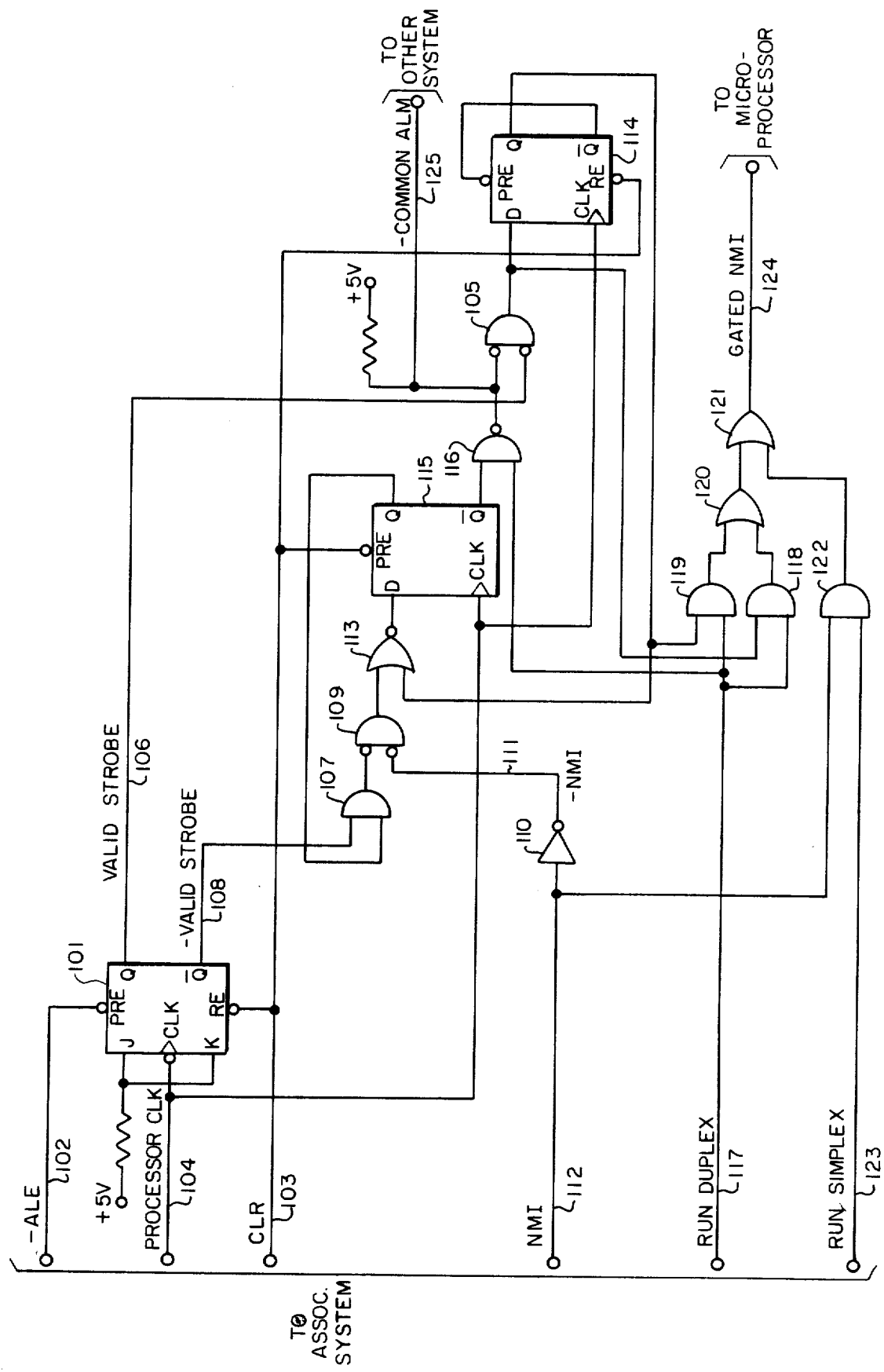

INTERRUPT SYNCHRONIZING CIRCUIT

FIELD OF THE INVENTION

The present invention relates to synchronously operating microprocessors and more particularly to a circuit for synchronizing an interrupt signal for such microprocessors.

BACKGROUND OF THE INVENTION

The typical arrangement for use of synchronous microprocessors is to have both microprocessors run the same program asynchronously and then compare their results at the end of each task. After presenting its operating results to a comparison circuit the faster microprocessor waits for a period of time while the slower microprocessor presents its operating results to the comparison circuit. Thus, the microprocessors are not actually running in synchronism, but rather, the microprocessors are continuously resynchronized after a predetermined number of operations.

The present invention enables two microprocessors to actually run synchronously with their address, data and status bits being compared during each bus cycle.

SUMMARY OF THE INVENTION

In accordance with the invention, a non-maskable interrupt synchronizing circuit is provided for use in a computer including duplicated processors, and duplicated systems, each associated with a different one of the processors and a different one of the synchronizing circuits, each of the systems being operating to provide a synchronized processor instruction status signal, synchronized clock pulses and an interrupt signal.

The synchronizing circuit comprises signaling means connected to the associated system and operated in response to alternately occurring clock pulses to provide synchronizing pulses.

Also included is a first storage circuit connected to the signaling means and the associated system and operated in response to the interrupt signal from the associated system and one of the synchronizing pulses to provide an alarm signal. The synchronizing circuit further includes a second storage circuit connected to the first storage circuit and operated in response to the alarm signal from the first storage circuit or the alarm signal from the first storage circuit of the other synchronizing circuit to apply a synchronized interrupt to the associated processor.

DESCRIPTION OF THE DRAWING

The single FIGURE of the accompanying drawing is a schematic diagram of a interrupt synchronizing circuit in accordance with the present invention.

DESCRIPTION OF THE PREFERRED EMBODIMENT

The interrupt synchronizing circuit of the present invention synchronizes the non-maskable interrupt (NMI) signals of two microprocessors such as the Intel 80286 microprocessors. This synchronizing circuit allows each microprocessor to receive the NMI at an identical point in its relative bus timing sequence whether the NMI is the result of an error condition in either one or both of the subsystems associated with these microprocessors. The synchronizing circuit of the present invention includes special signals and handshaking circuitry that are necessary to synchronize the NMI inputs of the two microprocessors. Also, this invention negates the timing skew and gate delay effects involved with prior art handshaking arrangements.

The interrupt synchronizing circuit is provided in duplicate with each such circuit being associated with one of the duplicated microprocessors. An NMI signal, due to an alarm condition can occur at any time and must be presented to the microprocessors at an identical point in their relative bus timing sequence, even though a real time skew may exist between the bus timing of the subsystems associated with each microprocessor. A strobe signal is used to gate the NMI signal into each synchronizing circuit in such a manner that all race conditions are eliminated and both microprocessors are interrupted during their same relative clock phase.

The interrupt synchronizing circuit can function in either the simplex mode, where each microprocessor operates independently of the other, or in the duplex mode where the two microprocessors are running synchronously. In the simplex mode, an NMI signal due to an error condition on a subsystem associated with one of the microprocessors is sent directly to the microprocessor controlling that subsystem. In this mode the NMI signal does not have to be synchronized with any other signal. However, in the duplex mode, an NMI signal due to an error condition on one subsystem must be processed in such a manner that it can be presented and accepted by both microprocessors at an identical point in the relative bus timing sequence even though there may be a real time skew between those timing sequences. The strobe signal defines the time at which an NMI signal may be accepted, processed and presented to both microprocessors in such a manner that all race conditions are eliminated. This strobe signal slightly delays the presentation of the NMI signal to the microprocessors but this delay ensures that both microprocessors receive the NMI signal during the same processor clock phase.

Referring now to the accompanying drawing, the interrupt synchronizing circuit of the present invention is shown connectable between a microprocessor and an associated system. It is also shown connectable to the system associated with the other microprocessor. Thus, this drawing represents the synchronizing circuit that could be connected to one microprocessor and an identical synchronizing circuit would be provided for connection to the other microprocessor. The preset (PRE) input of J-K flip-flop 101 is shown connectable to the associated system by lead 102 and the reset (RE) input of this flip-flop is shown connectable to the associated system via lead 103. The clock (CLK) input of this flip-flop is also connectable to the associated system via lead 104 while the J and K inputs of this flip-flop are connected to a +5 volt source.

The Q output of flip-flop 101 is connected to one input of AND function gate 105 via valid strobe 106, while Q̄ output of this flip-flop is connected to one input of AND gate 107 via lead 108. One input of AND function gate 109 is connected to the output of AND gate 107 while the second input of this gate is connected to the output of inverter 110 via lead 111. The input of this inverter is connectable to the associated system via lead 112. One input of NOR gate 113 is connected to the output of AND function gate 109, while the clock (CLK) inputs of D-type flip-flops 114 and 115 are connectable to the associated system via lead 104. The reset (RE) input of D-type flip-flop 114 is connectable to the associated system via lead 103 and the preset (PRE) input of this flip-flop is connected to its Q output.

The input of D-type flip-flop 115 is connected to the output of NOR gate 113, while the preset (PRE) input of this this flip-flop is connectable to the associated system via lead lead 103. The Q output of this flip-flop is connected to a a second input of AND gate 107 while the $\overline{Q}$ output of this flip-flop is connected to a first input of NAND gate 116. A second input of this NAND gate is connectable to the associated system via lead 117. The output of this NAND gate is connected to a second input of AND function gate 105 whose output is connected to the D input of D-type flip-flop 114.

The output of AND function gate 105 is also connected to a first input of AND gate 118 while the Q output of D-type flip-flop 114 is connected to a first input of AND gate 119. A second input of these AND gates is connectable to the associated system via lead 117. The inputs of OR gate 120 are connected to the outputs of AND gates 118 and 119, while the output of this OR gate is connected to a first input of OR gate 121. A second input of this OR gate is connected to the output of AND gate 122 whose inputs are connectable to the associated system via NMI leads 112 and 123. The output of NOR gate 121 is connectable to the associated microprocessor by lead 124. Also AND gate 116 is connectable to the other system via lead 125

When the synchronizing circuit is connected as indicated in the drawing and power is initially applied to this circuit, flip-flops 101 and 114 are initially reset while flip-flop 115 is initially set. Address latch enable signal (-ALE) occurs during each processor status cycle. Thus, the interrupt synchronizing circuit of the present invention, associated with each microprocessor, is initially synchronized by this signal. This -ALE signal causes flip-flop 101 to become set and provides logic 1 VALID STROBE and logic level 0 -VALID STROBE signals at its Q and $\overline{Q}$ outputs, respectively. Since the J and K inputs are tied to a +5 volt source, this flip-flop will toggle on each successive processor CLK signal appearing at the clock (CLK) input. Consequently, flip-flop 101 provides alternating VALID STROBE and -VALID STROBE signals in response to each processor CLK pulse.

D-type flip-flop 115 is initially set by the clear (CLR) signal appearing at its PRE input and therefore, this flip-flop provides a logic level 1 signal at its Q output. This logic level 1 signal then appears at one of the inputs to AND gate 107, thereby enabling it to gate the -VALID STROBE signal from the $\overline{Q}$ output of flip-flop 101. Similarly, flip-flop 114 is initially reset by the CLR signal appearing at its reset (RE) input and therefore, a logic level 0 signal appears at its Q output. This logic level 0 signal also appears at one of the inputs of NOR gate 113, thereby allowing this NOR gate to be controlled by the input from AND function gate 109.

When a logic level 1 non-maskable interrupt (NMI) signal appears on lead 112, it is inverted into a logic level 0, -NMI signal by inverter 110. This logic level 0 signal is then applied to the second input of AND function gate 109. This -NMI signal is then gated by the -VALID STROBE signal since a logic level 0 -VALID STROBE signal appearing on lead 108 is gated by AND gate 107 to the first input of AND function gate 109. Since two logic level 0 signals then appear at the inputs to this AND function gate, this gate then applies a logic level 1 signal to the first input of NOR gate 113. NOR gate 113 then applies a logic level 0 signal to the D input of D-type flip-flop 115, causing it to reset on the next processor CLK signal appearing at its clock (CLK) input. When this flip-flop is reset, a logic level 0 signal appears at its Q output and a logic level 1 signal appears at its $\overline{Q}$ output. The logic level 0 signal at the Q output of flip-flop 115 is then applied to the second input of AND gate 107 causing it to constantly provide a logic level 0 signal at the first input of AND function gate 109. In this manner, D-type flip-flop 115 is prevented from toggling in response to the pulsing -VALID STROBE signal appearing at the first input of AND gate 107.

When the microprocessors are running in synchronism, a logic level 1, RUN DUPLEX signal appears on lead 117 and therefore, it also appears at the second input of NAND gate 116. Thus, this gate is enabled to gate the logic level 1 signal from the $\overline{Q}$ output of flip-flop 115. Since logic level 1 signals appear at both inputs of NAND gate 116, it applies a logic level 0 -COMMON ALARM signal to the other system via lead 125. This signal is also applied to the first input of AND function gate 105. The other synchronizing circuit and the synchronizing circuit shown in the drawing are connected to each in a wire-or arrangement via -COMMON ALARM lead 125. Consequently, logic level 0 -COMMON ALARM signals appear at the first input of AND function gate 105 in each such synchronizing circuit.

AND function gate 105 then gates the logic level 0 -COMMON ALARM signal when a logic level 0 VALID STROBE signal appears at its second input. This gate then applies a logic level 1 signal to the D input of the D-type flip-flop 114, causing it to set on the next processor CLK signal. Consequently, logic level 1 and 0 signals appear at the Q and $\overline{Q}$ outputs, respectively, of flip-flop 114. The logic level 0 signal appearing at the $\overline{Q}$ output of this flip-flop also apears at its present (PRE) input, thereby causing it to latch and prevent it from toggling in response to a pulsing VALID STROBE signal on lead 106. The logic level 1 signal appearing at the Q output of this flip-flop also appears at the second input of NOR gate 113 in both synchronizing circuits. These NOR gates then apply logic level 0 signals to the D input of each D-type flip-flop 115, thereby ensuring that both such flip-flops become latched even if the NMI signal originally appeared at only one such synchronizing circuit.

The logic level 1 signal appearing at the output of AND function gate 105 also appears at the first input of AND gate 118. When the microprocessors are running in duplex, a logic level 1 RUN DUPLEX signal appears on lead 117 and therefore, also at the second input of AND gates 118 and 119. Consequently, AND gate 118 applies a logic level 1 signal to the second input of OR gate 120 causing it to apply a logic level 1 signal to the first input of OR gate 121. This OR gate then applies a logic level 1 gated NMI signal to the associated microprocessor via lead 124. Thus, both microprocessors are simultaneously informed of the existence of an interrupt by the associated synchronizing circuit in response to an NMI signal from one or both of the associated systems.

Q of FF 114 is applied to the first input of AND gate 119 to ensure that Signal 'GATED NMI' is held true until it is recognized by the microprocessors.

If the synchronizing circuits are not being run in duplex, a logic level 1 RUN SIMPLEX signal appears on lead 123 causing AND gate 122 to gate the NMI signal appearing on lead 112, thereby providing a logic level 1 signal on lead 122. OR gate 121 then provides a logic level 1 gated NMI signal directly to the microprocessor via lead 124.

The synchronizing circuit of the present invention thus includes a unique handshake circuit which is based on the VALID STROBE signal. This novel synchronizing circuit is then able to synchronize the non-maskable interrupt (NMI) and apply it to the input of duplicated microprocessors, thereby allowing them both to recognize the interrupt at an identical point in their relative bus time sequence even though the cause of the interrupt may have occurred on only one or both of the associated systems.

It will be obvious to those skilled in the art that numerous modifications of the present invention can be made without departing from the spirit of the invention which shall be limited only by the scope of the claims appended hereto.

What is claimed is:

1. A synchronizing circuit for use in a computer including duplicated processors, and duplicated systems, each system associated with a different one of said processors and a different one of said synchronizing circuits, each of said systems being operated to provide a synchronized processor instruction status signal, synchronized clock pulses and an interrupt signal, each said synchronizing circuit comprising:
    signaling means connected to said associated system and operated in response to alternately occurring synchronized clock pulses and the synchronized processor instruction status signal from said associated system to provide synchronizing pulses;
    a first storage circuit connected to said signaling means and said associated system and operated in response to said interrupt signal from said associated system and one of said synchronizing pulses to provide an alarm signal; and
    a second storage circuit connected to said first storage circuit and connected to the first storage circuit of the other synchronizing circuit and operated in response to said alarm signal from said first storage circuit or said alarm signal from said first storage circuit of the other synchronizing circuit to apply a synchronized interrupt signal to said associated processor.

2. A synchronizing circuit as claimed in claim 1, wherein said first storage circuit comprises first gating means connected to said signaling means and said associated system and operated in response to one of said synchronizing pulses and said interrupt signal to provide a first trigger signal; and
    first storage means connected to said first gating means and operated in reponse to said first trigger signal to provide said alarm signal;
    said first gating means being operated in response to said alarm signal to inhibit said first trigger signal.

3. A synchronizing circuit as claimed in claim 2, wherein said first storage means comprises a first D-type flip-flop and second gating means connected to said first D-type flip-flop and said associated system which is operated to provide a gating signal of a first characteristic;
    said first D-type flip-flop being operated in response to said first trigger signal to provide a stored first trigger signal;
    said second gating means being operated in response to said stored first trigger signal and said gating signal of a first characteristic to provide said alarm signal.

4. A synchronizing circuit as claimed in claim 3, wherein said second gating circuit comprises an AND function gate.

5. A synchronizing circuit as claimed in claim 3, wherein said first gating means comprises:
    a first OR function gate connected to said signaling means and said first storage means and operated in response to said synchronizing pulse or said alarm signal to provide an enable signal;
    an AND function gate connected to said first OR function gate and said associated system and operated in response to said enable signal and said interrupt signal to provide a gated interrupt signal, and
    a second OR function gate connected to said AND function gate and operated in response to said gated interrupt signal or said stored alarm signal to provide said first trigger signal.

6. A synchronizing circuit as claimed in claim 2, wherein said first storage means comprises a first D-type flip-flop.

7. A synchronizing circuit as claimed in claim 2, wherein said first gating means comprises:
    an OR function gate connected to said signaling means and said first storage means and operated in response to one of said synchronizing pulses or said alarm signal to provide an enable signal; and
    an AND function gate connected to said OR function gate and said associated system and operated in response to said enable signal and said interrupt signal to provide said first trigger signal.

8. A synchronizing circuit as claimed in claim 1, wherein said second storage circuit comprises:
    an AND function gate connected to said first storage circuit and said signaling means and operated in response to one of said synchronizing pulses and said alarm signal to provide a gated alarm signal;
    a D-type flip-flop connected to said AND function gate and operated in response to said gated alarm signal to provide a stored alarm signal; and
    an output gating circuit connected to said D-type flip-flop, said AND function gate and operated in response to said alarm signal or said stored alarm signal to provide said synchronized interrupt signal.

9. A synchronized circuit as claimed in claim 8, wherein said output gating circuit is further connected to said associated system which is operated to provide a gating signal of a first characteristic, said output gating circuit being operated in response to said gating signal of a first characteristic and said alarm signal to provide said synchronized interrupt signal, and further operated in response to said gating signal of a first characteristic and said stored alarm signal to provide said synchronized interrupt signal.

10. A synchronizing circuit as claimed in claim 1, wherein said signaling means comprises a J-K flip-flop.

11. A synchronizing circuit as claimed in claim 1, wherein said second storage circuit comprises a D-type flip-flop.

12. A synchronizing circuit as claimed in claim 1, wherein said second storage circuit comprises:
    an AND function gate connected to said first storage circuit and said signaling means and operated in response to one of said synchronizing pulses and said alarm signal to provide a gated alarm signal; and
    a D-type flip-flop connected to said AND function gate and operated in response to said gated alarm signal to provide said synchronized interrupt signal.

* * * * *